United States Patent [19]
Takatani et al.

[11] Patent Number: 5,610,219
[45] Date of Patent: Mar. 11, 1997

[54] RESIN COMPOUND FOR MOLDING PRECISION PARTS, AND SLEEVE AND FERRULE PRODUCED THEREFROM

[75] Inventors: Shiro Takatani; Tetsuo Mitani; Fumiaki Baba, all of Amagasaki; Tsutomu Ohta; Kazuo Nakamura, both of Kamakura, all of Japan

[73] Assignee: Mitsubishi Denki Kabushiki Kaisha, Tokyo, Japan

[21] Appl. No.: 545,661

[22] PCT Filed: Mar. 16, 1995

[86] PCT No.: PCT/JP95/00456

§ 371 Date: Nov. 6, 1995

§ 102(e) Date: Nov. 6, 1995

[87] PCT Pub. No.: WO95/25770

PCT Pub. Date: Sep. 28, 1995

[30] Foreign Application Priority Data

Mar. 18, 1994 [JP] Japan .................................. 6-048923

[51] Int. Cl.$^6$ ............................. C08K 3/10; C08K 3/36; C08K 3/40; G02B 6/44
[52] U.S. Cl. .......................... 524/413; 524/437; 524/493; 524/494; 385/100
[58] Field of Search ................................ 524/413, 493, 524/437, 494; 385/100

[56] References Cited

U.S. PATENT DOCUMENTS

| | | | |
|---|---|---|---|
| 4,484,796 | 11/1984 | Sato et al. | 350/96.21 |
| 4,720,424 | 1/1988 | Eickman et al. | 428/323 |
| 5,427,712 | 6/1995 | Nakamura et al. | 252/299.01 |

FOREIGN PATENT DOCUMENTS

| | | |
|---|---|---|
| 57-196208 | 12/1982 | Japan . |
| 2-255766 | 10/1990 | Japan . |
| 4-202475 | 7/1992 | Japan . |
| 5-202292 | 8/1993 | Japan . |
| 5-239353 | 9/1993 | Japan . |

*Primary Examiner*—Thomas Hamilton, III
*Attorney, Agent, or Firm*—Burns, Doane, Swecker & Mathis, LLP

[57] ABSTRACT

A resin compound for molding precision parts containing 20 to 40% by weight of at least one of polyphenylene sulfide and aromatic polyester thermotropic liquid crystalline polymer, 15 to 25% by weight of whisker and 40 to 60% by weight of spherical fine particles, wherein the total content of the whisker and the spherical fine particles is 60 to 80% by weight, and a resin compound for molding precision parts containing 20 to 40% by weight of at least one of polyphenylene sulfide and aromatic polyester thermotropic liquid crystalline polymer, 5 to 25% by weight of whisker, 40 to 75% by weight of spherical fine particles and 0.5 to 3% by weight of silane coupling agent, wherein the total content of the whisker and the spherical fine particles is 60 to 80% by weight are disclosed. Mechanical strength of the resin compounds can be increased without the impairment of dimensional precision, surface smoothness and low coefficient of thermal expansion. The resin compounds can be suitably used for molding precision parts, for instance, sleeve, ferrule and the like.

10 Claims, 2 Drawing Sheets

RESIN COMPOUND FOR MOLDING PRECISION PARTS, AND SLEEVE AND FERRULE PRODUCED THEREFROM

TECHNICAL FIELD

The present invention relates to a resin compound for molding precision parts, and a sleeve and a ferrule produced therefrom, and more particularly to a resin compound for molding precision parts, which can be suitably used for parts for optical communication such as a sleeve and a ferrule, and a sleeve and a ferrule produced therefrom.

BACKGROUND ART

Conventionally, for instance, as disclosed in Japanese Unexamined Patent Publication No. 196208/1982, a resin compound containing an epoxy resin or polyphenylene sulfide in which 30 to 80% by weight of spherical quartz glass fine particles are filled is used for parts for optical communication such as a ferrule for an optical connector, which are precision parts. Ingredients of the above resin (epoxy resin) compound and the properties of a ferrule for an optical connector produced therefrom are shown in Table 1.

TABLE 1

| Conventional Examples | Ingredients of resin compound Quartz glass fine particles content (having an average particle diameter of about 10 μm) (% by weight) | Properties of ferrules | | Connectability |
|---|---|---|---|---|
| | | Precision | | |
| | | Circularity (μm) | Surface roughness (μm) | Optical loss (dB) |
| 1 | 29.5 | 1.2 | 0.6 | 0.70 |
| 2 | 49.7 | 1.1 | 0.6 | 0.68 |
| 3 | 69.5 | 1.2 | — | 0.60 |
| 4 | 81.0 | — | 0.7 | 0.68 |

From the properties of the ferrules shown in Table 1, it can be seen that the ferrule for an optical connector molded by using the resin compound containing the above spherical fine particles is excellent in optical loss during connecting with an optical fiber being at most 1 dB since circularity is about 1 μm and surface roughness is at most 1 μm.

Also, spherical fine particles are filled in a conventional resin compound as a filler. Therefore, it is known that distribution of the filler contained in a molded article and mold shrinkage become uniform and that dimensional precision of a molded article is increased. Also, the filler contained therein is composed of fine particles having an average particle diameter of about 10 μm. Therefore, it is also known that surface roughness of a molded article is small and a molded article is excellent in surface smoothness.

As mentioned above, the dimensional precision of a resulting molded article is increased by a conventional resin compound. However, there arises a problem that the contact area between the filler and the resin becomes small, so that mechanical strength of a molded article becomes low since the shape of the filler is spherical. Also, when the amount of the filler is increased in order to lower its coefficient of thermal expansion, there arise problems that moldability is lowered and that dimensional precision is lowered since contact friction of the fillers with each other is increased and melt viscosity of the resin compound is increased.

Also, the precision parts for an optical connector, made of a conventional resin compound, have advantages that circularity is high and that optical loss is small during connecting with an optical fiber. However, the mechanical strength is low. Therefore, there arises a problem that reliability is low during connecting with an optical fiber. Also, when coefficient of thermal expansion of precision parts for an optical connector is lowered by increasing the amount of the filler contained in a resin compound in order to lower the optical loss in accordance with the change of temperature during connecting with an optical fiber, melt viscosity of the resin compound becomes high. Therefore, there arise problems that moldability is lowered and that it becomes difficult to give precision parts for an optical connector, which are high in dimensional precision and small in optical loss during connecting with an optical fiber.

The present invention has been accomplished in consideration of the above-mentioned prior art.

An object of the present invention is to provide a resin compound which increases mechanical strength without impairment of dimensional precision, surface smoothness and low thermal expansive property, and which is suitable for, e.g. molding precision parts.

Another object of the present invention is to provide a resin compound which can lower the coefficient of thermal expansion without impairment of moldability.

The other object of the present invention is to provide a sleeve and a ferrule which are high in reliability during connecting with an optical fiber.

DISCLOSURE OF THE INVENTION

The present invention relates to a resin compound (composition) for molding precision parts, characterized in that the resin compound contains 20 to 40% by weight of at least one member of polyphenylene sulfide and an aromatic polyester thermotropic liquid crystalline polymer, 15 to 25% by weight of a whisker and 40 to 60% by weight of spherical fine particles, and that the total amount of the above whisker and the above spherical fine particles is 60 to 80% by weight; a resin compound which contains 20 to 40% by weight of at least one member of polyphenylene sulfide and an aromatic polyester thermotropic liquid crystalline polymer, 5 to 25% by weight of a whisker, 40 to 75% by weight of spherical fine particles and 0.5 to 3% by weight of a silane coupling agent, in which the total content of the above whisker and the spherical fine particles is 60 to 80% by weight; and a sleeve and a ferrule produced from the resin compound for molding precision parts.

BEST MODE FOR CARRYING OUT THE INVENTION

Figure 1:
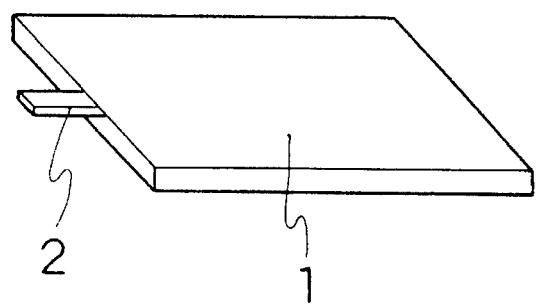
FIG. 1 is a perspective view of a test piece for measuring properties of the resin compound obtained in the examples of the present invention.

As mentioned above, the resin compound for molding precision parts of the present invention is characterized in that the resin compound contains 20 to 40% by weight of at least one member of polyphenylene sulfide and an aromatic polyester thermotropic liquid crystalline polymer, 15 to 25% by weight of a whisker and 40 to 60% by weight of spherical fine particles, and that the total content of the above whisker and the above spherical fine particles is 60 to 80% by weight.

In the resin compound for molding precision parts of the present invention, as a filler, not only the spherical fine particles but also the whisker is contained. Therefore, the contact area between the filler and the resin component is increased, and its mechanical strength is more excellent in comparison with that of a resin compound containing a conventional filler in the same amount as the resin compound of the present invention.

In the resin compound of the present invention, at least one member of the polyphenylene sulfide and the aromatic polyester thermotropic liquid crystalline polymer is used as the resin component. Accordingly, each of the polyphenylene sulfide and the aromatic polyester thermotropic liquid crystalline polymer can be used alone or in an admixture thereof.

The weight average molecular weight of the above polyphenylene sulfide is not particularly limited. However, it is desired that the weight average molecular weight is usually about 15000 to about 40000.

The above aromatic polyester thermotropic liquid crystalline polymer can be prepared by polymerizing at least one monomer selected from an aromatic diol, an aromatic dicarboxylic acid and an aromatic hydroxycarboxylic acid.

As typical examples of the above aromatic diol, there can be cited, for instance, a hydroquinone compound represented by the general formula:

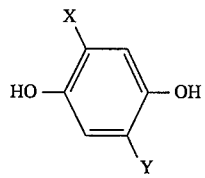

wherein each of X and Y is independently hydrogen atom, a halogen atom or an alkyl group having 1 to 5 carbon atoms, a naphthalene diol represented by 2,6-naphthalene diol represented by the formula:

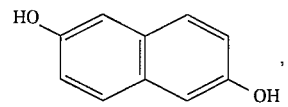

a biphenyl diol represented by biphenyl-4,4'-diol represented by the formula:

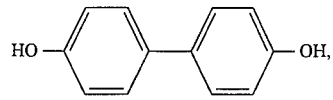

a biphenyl diol derivative represented by the general formula:

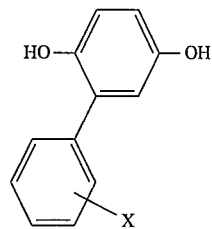

wherein X is as defined above, a dihydroxybenzene represented by 1,3-dihydroxybenzene represented by the formula:

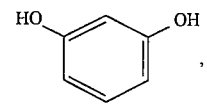

a bis(hydroxyphenyl) derivative represented by the general formula:

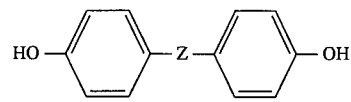

wherein Z is an alkylene group having 1 to 3 carbon atoms or —$SO_2$— group such as bis(4-hydroxyphenyl)methane, 2,2-bis(4-hydroxyphenyl)propane and bis(4-hydroxyphenyl)sulfone, a dihydroxyanthraquinone represented by 2,6-dihydroxyanthraquinone represented by the formula:

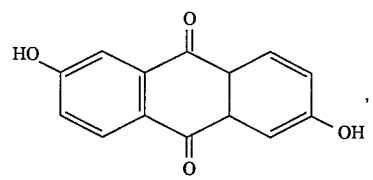

and the like.

As typical examples of the above aromatic dicarboxylic acid, there can be cited, for instance, a terephthalic acid compound represented by the general formula:

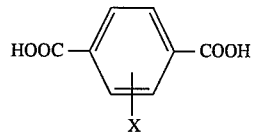

wherein X is as defined above, a biphenylcarboxylic acid represented by 4,4'-biphenyldicarboxylic acid represented by the formula:

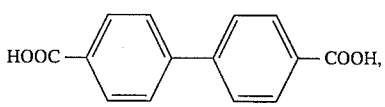

a naphthalenedicarboxylic acid represented by 2,6-naphthalenedicarboxylic acid represented by the formula:

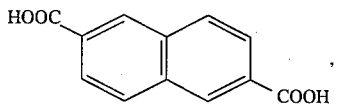

a bis(carboxyphenyl)oxide represented by bis(4-carboxyphenyl)oxide represented by the formula:

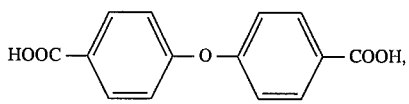

isophthalic acid represented by the formula:

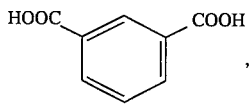

and the like.

As the above aromatic hydroxycarboxylic acid, there can be cited, for instance, a hydroxybenzoic acid compound represented by the general formula:

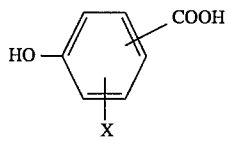

wherein X is as defined above, a carboxynaphtol represented by 6-carboxy-2-naphtol represented by the formula:

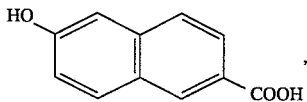

a hydroxycinnamic acid represented by 4-hydroxycinnamic acid represented by the formula:

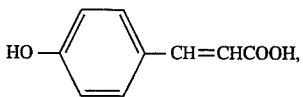

and the like.

As concrete examples of the above aromatic polyester thermotropic liquid crystalline polymer, there can be cited, for instance, an aromatic compound having two groups which are composed of at least one member selected from carboxyl group and hydroxyl group, such as p-hydroxybenzoic acid-terephthalic acid-p,p-bisphenol copolymer, polyethylene terephthalate-p-hydroxybenzoic acid copolymer, and the like.

The weight average molecular weight of the above aromatic polyester thermotropic liquid crystalline polymer is not particularly limited. However, it is desired that the weight average molecular weight is usually about 10000 to about 40000.

In the resin compound of the present invention, the content of at least one member of the above polyphenylene sulfide and the aromatic polyester thermotropic liquid crystalline polymer is adjusted to at least 20% by weight, preferably at least 25% by weight in order to improve moldability, and at most 40% by weight, preferably at most 35% by weight from the viewpoint of low thermal expansive property.

The whisker used in the present invention is not particularly limited. As typical ones, there can be cited, for instance, potassium titanate whisker, aluminum borate whisker, silicon carbide whisker, silicon nitride whisker, zinc oxide whisker, alumina whisker, graphite whisker and the like.

It is desired that the average fiber length of the needle-like portion of the above whisker (hereinafter referred to as average fiber length) is at most 30 μm, particularly at most 20 μm in order to improve surface smoothness. Also, it is desired that the aspect ratio (average fiber length/average fiber diameter) of the whisker is 5 to 500.

The above whisker content in the resin compound of the present invention is adjusted to at least 15% by weight in order to increase mechanical strength. Also, the content is adjusted to at most 25% by weight, preferably at most 20% by weight in order to increase dimensional precision of a resulting molded article. Moreover, when a silane coupling agent described below is mixed with the resin compound of the present invention, the above whisker content can be adjusted to at least 5% by weight, preferably at least 10% by weight.

The spherical fine particles used in the present invention are not particularly limited. As typical ones, there can be cited, for instance, silica, glass bead, alumina bead and the like.

It is desired that the average particle diameter of the above spherical fine particles is at most 20 μm, particularly at most 10 μm in order to improve surface smoothness.

It is desired that the particle size distribution ($D_w/D_n$) represented by the ratio of the weight average particle diameter ($D_w$) to the number average particle diameter ($D_n$) of the above spherical fine particles satisfies $D_w/D_n>5$. When the above spherical fine particles satisfies $D_w/D_n>5$, maximum filler content in the resin compound can be increased, and contact friction of the fillers with each other is lowered, thereby melt viscosity is lowered, and moldability is improved. That is, when a mixture of particles having different sizes is used, in other words, a mixture in particles having a distribution in the particle size is used, the filler can be filled therein more than monodispersion particles, and the maximum content is increased. Accordingly, viscosity becomes low when the content is adjusted to constant.

Generally, there are plural particle sizes showing the maximum value of the frequency (on the basis of weight) in the particle size-frequency distribution curve of spherical fine particles, and it is desired that the ratio of the particle diameters having two maximum values thereof (larger particle diameter/smaller particle diameter) is 4 to 10. When the above ratio of particle diameters is within the range, smaller particles thread paths between larger particles. Therefore, the spherical fine particles can be efficiently contained in the resin compound, and melt viscosity is lowered, thereby moldability comes to be improved.

Also, as to the above spherical fine particles, it is desired that the ratio of the above particle diameters having two maximum values (percentage (% by weight) of the particles whose particle diameter is larger/percentage (% by weight) of the particles whose particle diameter is smaller) (hereinafter referred to as "ratio of weight percentage") is 2 to 6.

Thus, when the above spherical fine particles have the above ratio of weight percentage, filling efficiency becomes better, higher maximum content is achieved, and melt viscosity is lowered, thereby moldability comes to be improved.

The above spherical fine particles content in the resin compound of the present invention is adjusted to at least 40% by weight, preferably at least 45% by weight from the viewpoint of low thermal expansive property. Also, the content is adjusted to at most 60% by weight, preferably at most 55% by weight in order to increase mechanical strength. Moreover, when a silane coupling agent described below is mixed with the resin compound of the present invention, the above spherical fine particles content can be adjusted to at most 75% by weight, preferably at most 60% by weight.

A silane coupling agent can be mixed with the resin compound of the present invention. When the silane coupling agent is mixed therewith, adhesion of the filler to the resin component is increased. Therefore, the mechanical strength of a resulting resin compound can be increased.

The kinds of the above silane coupling agent are not particularly limited. As typical ones, there can be cited, for instance, vinylsilanes such as vinyltriethoxysilane, phenylsilanes such as biphenylsilane and phenyltrimethoxysilane, aminosilanes such as 3-aminopropyltriethoxysilane and N-(2-aminoethyl)-3-aminopropyltrimethoxysilane, methacrylsilanes such as 3-methacryloxypropyltrimethoxysilane, epoxysilanes such as 3-glycidoxypropyltrimethoxysilane, mercaptosilanes such as 3-mercaptopropyltrimethoxysilane, and the like. Among these, the vinylsilanes and the phenylsilanes are preferable since hygroscopic property of the resin compound is lowered and dimensional stability is improved.

The above silane coupling agent content in the resin compound of the present invention is adjusted to at least 0.5% by weight, preferably at least 1% by weight in order to increase mechanical strength. Also, the content is adjusted to at most 3% by weight, preferably at most 2% by weight in order to restrain the increase of melt viscosity and improve moldability and dimensional stability.

The resin compound for molding precision parts of the present invention is obtained by mixing at least one member of the polyphenylene sulfide and the aromatic polyester thermotropic liquid crystalline polymer, the whisker, the spherical fine particles, and as occasion demands, the silane coupling agent together in predetermined amounts.

The resin compound of the present invention increases mechanical strength without the impairment of dimensional precision, surface smoothness and low thermal expansive property. Therefore, the resin compound can be suitably used for, e.g. parts for optical communication such as a sleeve and a ferrule.

Accordingly, when the resin compound of the present invention is used for parts for optical communication such as a sleeve and a ferrule, mechanical strength is increased and thereby reliability can be improved.

EXPERIMENTAL EXAMPLES

The relation between the kinds of the filler and surface smoothness (surface roughness) was studied. Using polyphenylene sulfide in which 60% by weight of the filler shown in Table 2 was filled, a test piece having a shape of plate (100×50×3 mm) shown in FIG. 1 was molded, and its surface roughness was measured by means of a surface roughness tester (made by Taylor-Hobson, trade name: Talysurf). The results are shown in Table 2.

TABLE 2

| Filler | | |
|---|---|---|
| Kind | Fiber length or particle diameter (μm) | Surface roughness (μm) |
| Glass fiber | 500 | 14.7 |
| Carbon fiber | 600 | 16.2 |
| Potassium 6-titanate whisker (aspect ratio: 15 to 70) | 16 | 0.6 |
| Aluminum borate whisker (aspect ratio: 10 to 60) | 20 | 0.6 |
| Zinc oxide whisker (aspect ratio: 5 to 100) | 30 | 0.7 |
| Spherical silica | 15 | 0.6 |
| Glass flake | 50 | 5.4 |
| Mica | 30 | 7.6 |

From the results shown in Table 2, it can be seen that when potassium titanate whisker, aluminum borate whisker, zinc oxide whisker or spherical silica fine particles is used, that is, when a whisker having an average fiber length of at most 30 μm or spherical fine particles having an average particle diameter of at most 20 μm is used as a filler, surface roughness becomes at most 1 μm, so that surface smoothness is improved.

EXAMPLE 1

After 20% by weight of polyphenylene sulfide (made by Kureha Chemical Industry Co., Ltd., trade name: W205), 25% by weight of potassium 6-titanate whisker (average fiber length: 16 μm, made by Otsuka Chemical Co Ltd, trade name: TISMO-N) and 55% by weight of spherical silica fine particles (average particle diameter: 8 μm, $D_w/D_n$=3.4, made by Tatsumori Ltd., trade name: H8) were mixed together, they were kneaded by means of a biaxial kneading extruder to give a resin compound in the form of a pellet.

As the properties of the obtained resin compound, (A) mold shrinkage, (B) surface roughness, (C) tensile strength, (D) coefficient of linear expansion and (E) melt viscosity were examined in accordance with the following methods. The results are shown in Table 3.

(A) Mold shrinkage

Using a vertical injection molding machine (made by SUMITOMO HEAVY INDUSTRIES, LTD., trade name: V110/75V), a plate shown in FIG. 1 is molded. The dimension of the molded plate is measured by means of a caliper, and mold shrinkage of the plate in a machine direction and a transverse direction is calculated in accordance with the equation:

[Mold shrinkage (%)] = [(Dimension of a mold) − (Dimension of a molded plate)]/[Dimension of a mold] × 100.

(B) Surface roughness

Using a surface roughness tester (made by Taylor-Hobson, trade name: Talysurf), surface roughness in a machine direction of the plate used in measuring mold shrinkage is measured.

(C) Tensile strength

Figure 2:
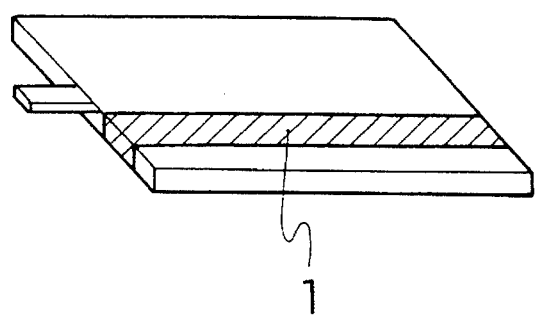
FIG. 2 is a perspective view showing a test piece for measuring properties of the resin compound obtained in the examples of the present invention.

The hatching portion (100×10×3 mm) of a test piece shown in FIG. 2 is cut away, and its tensile strength at room temperature is measured by means of a universal tester (made by ORIENTEC, trade name: TENSILON UTM-10T).

(D) Coefficient of linear expansion

Figure 3:
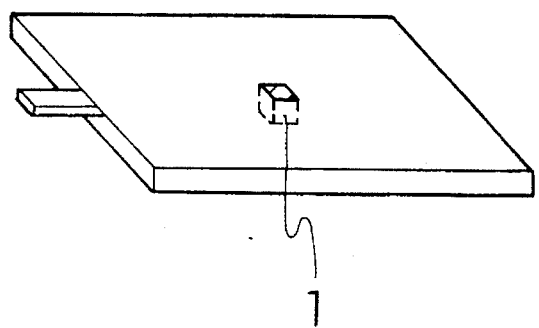
FIG. 3 is a perspective view showing a test piece for measuring properties of the resin compound obtained in the examples of the present invention.

The hatching portion (5×5×3 mm) of a test piece shown in FIG. 3 is cut away, and its coefficient of linear expansion in a machine direction and a transverse direction is measured by means of a thermal mechanical analyzer (made by Perkin-Elmer, trade name: TMA-7).

(E) Melt viscosity

The viscosity of the pellet made of the resin compound is measured under the conditions that the temperature of the resin is 320° C. and that shear rate is 100/second by means of a Capirograph (made by Toyo Seiki Seisaku-Sho, Ltd.).

The results of judgement given as a criterion for practical use based upon the above physical properties (A) to (E) are shown in Table 3.

The criteria for judgement are as follows.

(Criteria for judgement)

⊚: The resin compound is excellent in each physical property.

o: The resin compound is available.

X: The resin compound is not available.

From the results shown in Table 3, it can be seen that the resin compound obtained in Example 1 can be suitably used for molding precision parts since the resin compound is small in anisotropy of shrinkage, high in dimensional precision of the molded article, excellent in surface smoothness, high in tensile strength and low in coefficient of thermal expansion.

EXAMPLES 2 TO 4

Using the same materials as in Example 1, a resin compound was prepared in the same manner as in Example 1 except that polyphenylene sulfide, the whisker and the spherical fine particles were mixed together in the amounts shown in Table 3, and its properties were measured in the same manner as in Example 1. The results are shown in Table 3.

From the results shown in Table 3, it can be seen that the resin compound obtained in Examples 2 to 4 can be suitably used for precision parts since dimensional precision is high, surface roughness is low, that is, the resin compound is excellent in surface smoothness and show high tensile strength and low coefficient of thermal expansion.

EXAMPLE 5

After 26% by weight of polyphenylene sulfide (made by Tohpren, trade name: LN2), 18% by weight of aluminum borate whisker (average fiber length: 20 μm, aspect ratio: 10 to 60, made by Shikoku Chemical Corp., trade name: Alborex Y) and 56% by weight of spherical silica fine particles (average particle diameter: 8 μm, $D_w/D_n=3.4$, made by Tatsumori Ltd., trade name: H8) were mixed together, a resin compound was obtained in the same manner as in Example 1.

The properties of the obtained resin compound were examined in the same manner as in Example 1. The results are shown in Table 3.

From the results shown in Table 3, it can be seen that the resin compound obtained in Example 5 can be suitably used for molding precision parts since the resin compound is small in anisotropy of shrinkage, high in dimensional precision of the molded article, excellent in surface smoothness, high in tensile strength and low in coefficient of thermal expansion.

EXAMPLE 6

After 24% by weight of polyphenylene sulfide (made by Tohpren, trade name: LN2), 17% by weight of zinc oxide whisker (average fiber length: 30, aspect ratio: 5 to 100, made by Matsushita AMTEC CO., LTD., trade name: Panatetra WZ-0501) and 59% by weight of spherical silica fine particles (average particle diameter: 8 μm, $D_w/D_n=3.4$, made by Tatsumori Ltd., trade name: H8) were mixed together, a resin compound was obtained in the same manner as in Example 1.

The properties of the obtained resin compound were examined in the same manner as in Example 1. The results are shown in Table 3.

From the results shown in Table 3, it can be seen that the resin compound obtained in Example 6 can be suitably used for molding precision parts since the resin compound is small in anisotropy of shrinkage, high in dimensional precision of the molded article, and low in coefficient of thermal expansion.

EXAMPLE 7

A resin compound was obtained by using spherical silica fine particles (average particle diameter: 9 μm, $D_w/D_n=5.5$, made by Tatsumori Ltd., trade name: Y-40) as spherical fine particles in Example 2 and adjusting the amounts of each component as shown in Table 3. The properties of the obtained resin compound were examined in the same manner as in Example 1. The results are shown in Table 3.

From the results of Example 2 and Example 7 shown in Table 3, it can be seen that when particle size distribution ($D_w/D_n$) is as wide as 5.5, melt viscosity becomes low and moldability is more improved in comparison with Example 2 in which the silica content is the same as in Example 7.

COMPARATIVE EXAMPLES 1 TO 7

Using the same materials as in Example 1, a resin compound was obtained in the same manner as in Example 1 except that the amounts of polyphenylene sulfide, the whisker and the spherical particles in Example 1 were changed to the amounts shown in Table 3.

The properties of the obtained resin compound were examined in the same manner as in Example 1. The results are shown in Table 3.

From the results shown in Table 3, Comparative Example 1 corresponds to prior art in which the whisker is not contained, and its tensile strength is low.

The resin compound obtained in Comparative Example 2 is prepared by filling 85% by weight in total of the whisker and the spherical fine particles in 15% by weight of polyphenylene sulfide, and has a filler content higher than the resin compounds obtained in Examples 1 to 10. Therefore, melt viscosity became remarkably high, thereby the resin compound could not be kneaded.

The resin compound obtained in Comparative Example 3 is composed of 50% by weight of polyphenylene sulfide and 50% by weight in total of the whisker and the spherical fine particles, and has a filler content lower than the resin compounds obtained in Examples 1 to 10. Therefore, coefficient of thermal expansion was high.

From the aforementioned results, it could be seen that the content of polyphenylene sulfide which is a resin component of the resin compound being 20 to 40% by weight, that is, the filler content being 60 to 80% by weight was necessitated.

Next, when the filler content is 60 to 80% by weight, the ratios of the whisker and the spherical fine particles are studied.

The resin compound obtained in Comparative Example 4 contains 10% by weight of the whisker and 60% by weight of the spherical fine particles, and the whisker content is lower than that of the resin compound obtained in the above Example. Therefore, it can be seen that the reinforcing effect shown by a fibrous filler is small and that mechanical strength is low.

The resin compound obtained in Comparative Example 5 contains 30% by weight of the whisker and 40% by weight of the spherical fine particles, and the whisker content is higher than that of the resin compound obtained in the above Example. Therefore, it can be seen that the orientation of the whisker contained in the molded article is large, that anisotropy of shrinkage is large and that dimensional precision is lowered.

The resin compound obtained in Comparative Example 6 contains 25% by weight of the whisker and 35% by weight of the spherical fine particles, and the spherical fine particles content is lower than that of the resin compound obtained in the above Example. Therefore, it can be seen that the orientation of the whisker contained in the molded article is large, that anisotropy of shrinkage is large and that dimensional precision is lowered.

The resin compound obtained in Comparative Example 7 contains 10% by weight of the whisker and 70% by weight of the spherical fine particles, and the spherical fine particles content is higher than that of the resin compound obtained in the above Example. Therefore, it can be seen that the whisker content becomes low, that the reinforcing effect shown by the whisker is small and that mechanical strength is lowered.

From the aforementioned results, it can be seen that 20 to 40% by weight of polyphenylene sulfide, 15 to 25% by weight of the whisker and 40 to 60% by weight of the spherical fine particles should be used in order to increase mechanical strength without the impairment of dimensional precision, surface smoothness and low thermal expansive property.

In other words, the resin compounds obtained in Examples 1 to 7 contain 20 to 40% by weight of polyphenylene sulfide, 15 to 25% by weight of the whisker and 40 to 60% by weight of the spherical fine particles, and also contain 60 to 80% by weight in total content of the whisker and the spherical fine particles. Therefore, it can be seen that mechanical strength is increased without the impairment of dimensional precision, surface smoothness and low thermal expansive property. Particularly, it can be seen that the resin compound obtained in Example 7 is low in viscosity and excellent in moldability since furthermore particle size distribution of the spherical fine particles is wider.

EXAMPLE 8

After 30% by weight of polyphenylene sulfide (made by Kureha Chemical Industry Co., Ltd., trade name: W205), 20% by weight of potassium 6-titanate whisker (average fiber length: 16 μm, aspect ratio: 15 to 70, made by Otsuka Chemical Co Ltd, trade name: TISMO-N), 49% by weight of spherical silica fine particles (average particle diameter: 8 μm, $D_w/D_n$=3.4, made by Tatsumori Ltd., trade name: H8), and as a silane coupling agent 1% by weight of N-(2-aminoethyl)-3-aminopropyltrimethoxysilane (made by Shin-Etsu Chemical Co., Ltd., trade name: KBM603) were mixed together, a resin compound was prepared in the same manner as in Example 1, and its properties were measured in the same manner as in Example 1. The results are shown in Table 3.

From the results shown in Table 3, it can be seen that adhesion of the filler to the resin, tensile strength and dimensional precision are high, surface smoothness is improved and coefficient of thermal expansion is low since the silane coupling agent is contained in the resin compound obtained in Example 8, so that the resin compound can be suitably used for molding precision parts.

EXAMPLE 9

Using the same materials as in Example 8, a resin compound was prepared in the same manner as in Example 8 except that polyphenylene sulfide, the whisker and the spherical fine particles were mixed together in the ratios shown in Table 3, and its properties were measured in the same manner as in Example 1. The results are shown in Table 3.

From the results shown in Table 3, it can be seen that adhesion of the filler to the resin, tensile strength and dimensional precision are high, surface smoothness is improved and coefficient of thermal expansion is low since the silane coupling agent is contained in the resin compound obtained in Example 9 nevertheless only 5% by weight of the whisker is contained therein, so that the resin compound can be suitably used for molding precision parts.

EXAMPLE 10

After 25% by weight of polyphenylene sulfide (made by Tohpren, trade name: LN2), 9% by weight of aluminum borate whisker (average fiber length: 20 μm, aspect ratio: 10 to 60, made by Shikoku Chemical Corp., trade name: Alborex Y) and 55% by weight of spherical silica fine particles (average particle diameter: 8 μm, $D_w/D_n$=3.4, made by Tatsumori Ltd., trade name: H8), and as a silane coupling agent 1% by weight of N-(2-aminoethyl)-3-aminopropyltrimethoxysilane (made by Shin-Etsu Chemical Co., Ltd., trade name: KBM603) were mixed together, a resin compound was prepared in the same manner as in Example 1 and its properties were measured in the same manner as in Example 1. The results are shown in Table 3.

From the results shown in Table 3, it can be seen that adhesion of the filler to the resin, tensile strength and dimensional high, precision are surface smoothness is improved and coefficient of thermal expansion is low since the silane coupling agent is contained in the resin compound obtained in Example 10 nevertheless only 9% by weight of the whisker is contained therein, so that the resin compound can be suitably used for molding precision parts.

TABLE 3

| | Ingredients of resin compound (% by weight) | | | | |
|---|---|---|---|---|---|
| | Polyphenylene sulfide | Whisker | Spherical silica fine particles | Silane coupling agent | Material of whisker |
| Ex. No. | | | | | |
| 1 | 20 | 25 | 55 | — | Potassium titanate |
| 2 | 25 | 15 | 60 | — | Potassium titanate |
| 3 | 30 | 20 | 50 | — | Potassium titanate |
| 4 | 40 | 20 | 40 | — | Potassium titanate |
| 5 | 26 | 18 | 56 | — | Aluminum borate |
| 6 | 24 | 17 | 59 | — | Zinc oxide |
| 7 | 25 | 15 | 60 | — | Potassium titanate |
| 8 | 30 | 20 | 49 | 1 | Potassium titanate |
| 9 | 25 | 5 | 69 | 1 | Potassium titanate |
| 10 | 26 | 9 | 64 | 1 | Aluminum borate |
| Com. Ex. | | | | | |
| 1 | 30 | — | 70 | — | Potassium titanate |
| 2 | 15 | 25 | 60 | — | Potassium titanate |
| 3 | 50 | 15 | 35 | — | Potassium titanate |
| 4 | 30 | 10 | 60 | — | Potassium titanate |
| 5 | 30 | 30 | 40 | — | Potassium titanate |
| 6 | 40 | 25 | 35 | — | Potassium titanate |
| 7 | 20 | 10 | 70 | — | Potassium titanate |

| | Properties of resin compound | | | | | | |
|---|---|---|---|---|---|---|---|
| | Mole Shrinkage (%) (machine direction/ transverse direction) | Surface roughness (μm) | Tensile strength (MPa) | Coefficient of linear expansion ($10^{-5}$/K) (machine direction/ transverse direction) | Melt viscosity (Pa · s) | Judgement | Note |
| Ex. No. | | | | | | | |
| 1 | 0.26/0.29 | 0.5 | 65 | 1.3/1.6 | 1400 | ○ | |
| 2 | 0.29/0.35 | 0.5 | 66 | 1.5/1.7 | 780 | ○ | |
| 3 | 0.37/0.44 | 0.5 | 85 | 1.7/2.0 | 440 | ○ | |
| 4 | 0.55/0.61 | 0.6 | 80 | 2.1/2.8 | 380 | ○ | |
| 5 | 0.30/0.34 | 0.5 | 78 | 1.6/1.9 | 880 | ○ | |
| 6 | 0.35/0.38 | 0.6 | 63 | 1.5/1.7 | 860 | ○ | |
| 7 | 0.30/0.35 | 0.4 | 71 | 1.6/1.8 | 590 | ⊙ | |
| 8 | 0.48/0.55 | 0.4 | 102 | 1.8/2.1 | 480 | ○ | |
| 9 | 0.37/0.40 | 0.6 | 60 | 1.5/1.6 | 840 | ○ | |
| 10 | 0.27/0.32 | 0.6 | 63 | 1.5/1.7 | 610 | ○ | |
| Com. Ex. | | | | | | | |
| 1 | 0.36/0.39 | 0.5 | 37 | 1.8/1.9 | 490 | X | Strength is low. |
| 2 | — | — | — | — | — | X | It is impossible to knead. |
| 3 | 0.72/0.67 | 0.6 | 86 | 3.5/4.1 | 310 | X | Coefficient of linear expansion is high. |
| 4 | 0.42/0.48 | 0.5 | 56 | 1.7/1.9 | 700 | X | Strength is low. |
| 5 | 0.29/0.45 | 0.4 | 80 | 1.5/1.8 | 450 | X | Difference between shrinkages is large. |
| 6 | 0.51/0.71 | 0.5 | 94 | 2.4/3.6 | 390 | X | Difference between shrinkages is large. |
| 7 | 0.28/0.31 | 0.5 | 48 | 1.4/1.6 | 1600 | X | Strength is low. |

From the aforementioned results, when the silane coupling agent is used in the resin compound of the present invention, it can be seen that 20 to 40% by weight of polyphenylene sulfide, 5 to 25% by weight of the whisker, 40 to 75% by weight of the spherical fine particles and 0.5 to 3% by weight of the silane coupling agent should be mixed together in order to increase mechanical strength without the impairment of dimensional precision, surface smoothness and low thermal expansive property.

EXAMPLES 11 TO 15

After 25% by weight of polyphenylene sulfide (made by Tohpren, trade name: LN2), 9% by weight of aluminum borate whisker (average fiber length: 20 μm, aspect ratio: 10 to 60, made by Shikoku Chemical Corp., trade name: Alborex Y), 55% by weight of spherical silica fine particles (average particle diameter: 8 μm, $D_w/D_n$=3.4, made by Tatsumori Ltd., trade name: H8) and as the silane coupling agent 1% by weight of vinyltriethoxysilane (made by Shin-Etsu Chemical Co., Ltd., trade name: KBM1003, hereinafter referred to as vinylsilane), 1% by weight of phenyltrimethoxysilane (made by Shin-Etsu Chemical Co., Ltd., trade name: KBM103, hereinafter referred to as phenylsilane), 1% by weight of 3-glycidoxypropyltrimethoxysilane (made by Shin-Etsu Chemical Co., Ltd., trade name: KBM403, hereinafter referred to as epoxysilane), 1% by weight of N-(2-aminoethyl)-3-aminopropyltrimethoxysilane (made by Shin-Etsu Chemical Co., Ltd., trade name: KBM603, hereinafter referred to as aminosilane) or 1% by weight of 3-methacryloxypropyltrimethoxysilane (made by Shin-Etsu Chemical Co., Ltd., trade name: MB503, hereinafter referred to as methacrylsilane) were mixed together, a resin compound was prepared in the same manner as in Example 1 and a test piece 1 shown in FIG. 1 was molded. After the test piece was in an allowed to stand in an atmosphere having a temperature of 85° C. and a relative humidity of 85% for 100 hours, coefficient of moisture absorption and percentage of dimensional change were examined. The results are shown in Table 4.

TABLE 4

| Ex. No. | Kind of silane coupling agent | Coefficient of moisture absorption (%) | Percentage of dimensional change (%) | Tensile strength (MPa) | Judgement |
|---|---|---|---|---|---|
| 11 | Vinylsilane | 0.09 | 0.01 | 84 | ◉ |
| 12 | Phenylsilane | 0.06 | 0.01 | 65 | ◉ |
| 13 | Epoxysilane | 0.18 | 0.04 | 70 | ○ |
| 14 | Aminosilane | 0.15 | 0.02 | 96 | ○ |
| 15 | Methacrylsilane | 0.16 | 0.03 | 67 | ○ |

From the results shown in Table 4, it can be seen that the resin compound obtained in Example 11 in which vinylsilane is used, and the resin compound obtained in Example 12 in which phenylsilane is used as a silane coupling agent, respectively, are excellent in dimensional stability since they are low in coefficient of moisture absorption and percentage of dimensional change.

Next, when the filler content is increased in order to lower the coefficient of thermal expansion, the contact friction of the fillers with each other is increased during fluidizing, melt viscosity of the resin compound becomes high, and moldability and dimensional precision come to be lowered.

Hereupon, the following experiments were carried out in order to lower the melt viscosity and the improve moldability by adjusting the particle size distribution of the filler when the filler content is high.

EXAMPLE 16

After 25% by weight of polyphenylene sulfide (made by Kureha Chemical Industry Co., Ltd., trade name: W205), 20% by weight of potassium 6-titanate whisker (average fiber length: 16 μm, aspect ratio: 15 to 70, made by Otsuka Chemical Co Ltd, trade name: TISMO-N), 40% by weight of spherical silica fine particles (average particle diameter: 8 μm, $D_w/D_n$32 3.4, made by Tatsumori Ltd., trade name: H8) and 15% by weight of spherical silica fine particles (average particle diameter: 2 μm; $D_w/D_n$=2.4, made by Tatsumori Ltd., trade name: SO-C$_5$) were mixed together, and a resin compound was prepared in the same manner as in Example 1. Then, its properties were measured in the same manner as in Example 1. The results are shown in Table 5.

There were two maximum values in the particle size-frequency distribution curve of the spherical silica fine particles used in Example 16.

From the results shown in Table 5, it can be seen that the resin compound obtained in Example 16 is excellent in moldability since the melt viscosity is low, and the resin compound is high in dimensional precision and surface smoothness of the molded article, and low in coefficient of thermal expansion, so that the resin compound is suitable for molding precision parts.

EXAMPLE 17

Using the same materials as in Example 16, a resin compound was prepared in the same manner as in Example 1 except that the materials in Example 7 were mixed together so that the materials were composed of 25% by weight of polyphenylene sulfide, 20% by weight of the whisker, and as the spherical fine particles 40% by weight of the spherical silica fine particles (average particle diameter: 8 μm, $D_w/D_n$=3.4, made by Tatsumori Ltd., trade name: H8) and 15% by weight of the spherical silica fine particles (average particle diameter: 0.8 μm, $D_w/D_n$=2.3, made by Tatsumori Ltd., trade name: SO-C3). Then, its properties were measured in the same manner as in Example 1. The results are shown in Table 5.

There are two maximum values in the particle size-frequency distribution curve of the spherical silica fine particles used in Example 17.

From the results shown in Table 5, it can be seen that the resin compound obtained in Example 17 is excellent in moldability since melt viscosity is low, and the resin compound is high in dimensional precision and surface smoothness, and low in coefficient of thermal expansion, so that the resin compound is suitable for molding precision parts.

EXAMPLE 18

After 25% by weight of polyphenylene sulfide (made by Kureha Chemical Industry Co., Ltd., trade name: W205), 20% by weight of potassium 6-titanate whisker (made by Otsuka Chemical Co LTD., trade name: TISMO-N), 40% by weight of spherical silica fine particles (average particle diameter: 8 μm, $D_w/D_n$=3.4, made by Tatsumori Ltd., trade name: H8), 14% by weight of spherical silica fine particles (average particle diameter: 2 μm, $D_w/D_n$=2.4, made by Tatsumori Ltd., trade name: SO-C5) and as the silane coupling agent 1% by weight of N-(2-aminoethyl)-3-aminopropyltrimethoxysilane (made by Shin-Etsu Chemical Co., Ltd., trade name: KBM603) were mixed together, and a resin compound was prepared in the same manner as in Example 1. Then, its properties were measured in the same manner as in Example 1. The results are shown in Table 5.

From the results shown in Table 5, it can be seen that melt viscosity of the resin compound obtained in Example 18 is lowered since there are two maximum values in the distribution curve of the used spherical silica fine particles similar to Examples 16 and 17, the ratio of the diameters having their maximum values is 4 to 10 and their weight percentage is 2 to 6. Furthermore, it can be seen that the adhesion of the filler to the resin is increased, tensile strength is more increased, moreover dimensional precision and surface smoothness are high and coefficient of thermal expansion is small since the resin compound contains the silane coupling agent, so that the resin compound is suitable for molding precision parts.

Other silane coupling agents can be used instead of the above silane coupling agent in the same manner as in Examples 11 to 15, and the improvement of the properties was ascertained when the content was within the range of 0.5 to 3% by weight.

EXAMPLE 19

A resin compound was prepared in the same manner as in Example 16 except that 40% by weight of spherical silica fine particles (average particle diameter: 8 μm, $D_w/D_n$=3.4, made by Tatsumori Ltd., trade name: H8) and 15% by weight of spherical silica fine particles (average particle diameter: 0.4 μm, $D_w/D_n$=2.0, made by Tatsumori Ltd., trade name: SO-C2) were used as the spherical fine particles in Example 7. Then, its properties were measured in the same manner as in Example 1. The results are shown in Table 5.

EXAMPLE 20

A resin compound was prepared in the same manner as in Example 16 except that 40% by weight of spherical silica fine particles (average particle diameter: 0.8 μm, $D_w/D_n$=2.3, made by Tatsumori Ltd., trade name: SO-C3) and 15% by weight of spherical silica fine particles (average particle diameter: 0.4 μm, $D_w/D_n$=2.0, trade name: SO-C2) were used as the spherical fine particles in Example 7. Then, its properties were measured in the same manner as in Example 1. The results are shown in Table 5.

existence of the maximum values is remarkable. Accordingly, it can be seen that coefficient of thermal expansion is low, moldability becomes excellent, moreover mechanical strength and dimensional precision are high, and surface smoothness is excellent since the maximum content is increased and melt viscosity is lowered, so that the resin compounds are suitable for molding precision parts.

In the above Examples, the resin compounds showing two maximum values in the particle size-frequency distribution curve of silica are described. However, even though fine particles having a particle size distribution in which there are at least three maximum values are used, the same effects as the above are exhibited when the above conditions are satisfied with the ratio of the particle diameters having their maximum values and the ratio of weight percentages.

Also, there are two maximum values in the particle size-distribution curve of the two members of the spherical silica fine particles used in Example 19 and Example 20. The above ratios of particle diameters are 16 and 2, respectively. Therefore, it was not ascertained that viscosity is lowered.

EXAMPLE 21

In Example 1, using p-hydroxybenzoic acid-2-hydroxy-6-naphthoic acid copolymer (made by Polyplastics Co., Ltd.,

TABLE 5

| | Ingredients of resin compound (% by weight) | | | |
|---|---|---|---|---|
| Ex. No. | Polyphenylene sulfide | Potassium titanate whisker | Average particle diameter of spherical silica fine particles (8.0/2.0/0.8/0.4 μm) | Silane coupling agent |
| 16 | 25 | 20 | 40/15/0/0 | — |
| 17 | 25 | 20 | 40/0/15/0 | — |
| 18 | 25 | 20 | 40/14/0/0 | 1 |
| 19 | 25 | 20 | 40/0/0/15 | — |
| 20 | 25 | 20 | 0/0/40/15 | — |

| | Properties of resin compound | | | | | |
|---|---|---|---|---|---|---|
| Ex. No. | Mold Shrinkage (%) (machine direction/ transverse direction) | Surface roughness (μm) | Tensile strength (MPa) | Coefficient of linear expansion ($10^{-5}$/K) (machine direction/ transverse direction) | Melt viscosity (Pa · s) | Judgement |
| 16 | 0.28/0.34 | 0.4 | 69 | 1.5/1.7 | 390 | ⊙ |
| 17 | 0.29/0.35 | 0.5 | 66 | 1.6/1.8 | 370 | ⊙ |
| 18 | 0.33/0.40 | 0.5 | 93 | 1.6/1.9 | 450 | ⊙ |
| 19 | 0.30/0.35 | 0.3 | 70 | 1.5/1.8 | 750 | ○ |
| 20 | 0.35/0.38 | 0.4 | 68 | 1.6/2.0 | 770 | ○ |

From the results shown in Table 5, it can be seen that when the ratio of the particle diameters (larger particle diameter/smaller particle diameter) having two maximum values shown in the particle size-frequency distribution curve of the spherical silica fine particles used in Example 16 is 4, the contact friction between the spherical silica fine particles during fluidizing is lowered, melt viscosity is lowered and moldability is improved.

It can be seen that the contact friction between the spherical silica fine particles during fluidizing is lowered, melt viscosity is lowered and moldability is improved by using spherical silica fine particles having the above ratio of the particle diameters of 10 in combination with each other in Example 17. That is, in Examples 16 and 17, there are two maximum values the particles size-frequency distribution curve of the spherical fine particles, the ratio of the particle diameters having their maximum values is 4 to 10, furthermore the ratio of their weight percentages is 2 to 6, and the trade name: Vectra A950) as the aromatic polyester thermotropic liquid crystalline polymer instead of polyphenylene sulfide, 20% by weight of this liquid crystalline polymer, 25% by weight of potassium 6-titanate whisker (average fiber length: 16 μm, aspect ratio: 15 to 70, made by Otsuka Chemical Co Ltd, trade name: TISMO-N) and 55% by weight of spherical silica fine particles (average particle diameter: 8 μm, $D_w/D_n$=3.4, made by Tatsumori Ltd., trade name: H8) were mixed together, and a resin compound was prepared in the same manner as in Example 1. Then, its properties were measured in the same manner as in Example 1. The results are shown in Table 6.

From the results shown in Table 6, it can be seen that the resin compound obtained in Example 21 can be suitably used for molding precision parts since the resin compound is high in dimensional precision of the molded article, excellent in surface smoothness, high in tensile strength and low in coefficient of thermal expansion.

EXAMPLES 22 TO 24

Using the same materials as in Example 21, a resin compound was prepared in the same manner as in Example 1 except that p-hydroxybenzoic acid-2-hydroxy-6-naphthoic acid copolymer (made by Polyplastics Co., Ltd., trade name: Vectra A950) as the liquid crystalline polymer, the whisker and the spherical silica fine particles were mixed together in Example 21 in the amounts shown in Table 6. Then, its properties were measured in the same manner as in Example 1. The results are shown in Table 6.

From the results shown in Table 6, it can be seen that the resin compounds obtained in Examples 22 to 24 can be suitably used for molding precision parts since the resin compounds are high in dimensional precision of the molded article, low in surface roughness, that is, excellent in surface smoothness, high in tensile strength and low in coefficient of thermal expansion.

EXAMPLE 25

A resin compound was prepared by mixing the components shown in Table 6 in the same amounts as in Example 22 except that spherical silica fine particles (average particle diameter: 9 μm, $D_w/D_n$=5.5, made by Tatsumori Ltd., trade name: Y-40) were used as the spherical silica fine particles in Example 22. Then, its properties were measured in the same manner as in Example 1. The results are shown in Table 6.

From the results shown in Table 6, it can be seen that viscosity is more lowered and moldability is more improved in comparison with those of the resin compound obtained in Example 22 in which the silica is contained in the same amount as in Example 25 when the particle size distribution $(D_w/D_n)$ is as wide as 5.5.

Comparative Examples 8 to 14

Using the same materials as in Example 21, a resin compound was prepared in the same manner as in Example 1 except that p-hydroxybenzoic acid-2-hydroxy-6-naphthoic acid copolymer (made by Polyplastics Co., Ltd., trade name: Vectra A950) as the liquid crystalline polymer, the whisker and the spherical fine particles were mixed together in the amounts shown in Table 6 in Example 21. Then, its properties were measured in the same manner as in Example 1. The results are shown in Table 6.

From the results shown in Table 6, it can be seen that the resin compound obtained in Comparative Example 8 corresponds to that of prior art not containing the whisker, and is low in tensile strength.

The resin compound obtained in Comparative Example 9 is composed of 15% by weight of the liquid crystalline polymer and 85% by weight in total of the whisker and the spherical fine particles, which is higher in the filler content in comparison with the above Example, so that melt viscosity is remarkably high and its kneading cannot be carried out.

The resin compound obtained in Comparative Example 10 is composed of 50% by weight of the liquid crystalline polymer and 50% by weight in total of the whisker and the spherical fine particles. It can be seen that coefficient of thermal expansion is increased since its filler content is lower than that of resin compound obtained in the above Example.

From the aforementioned results, it can be seen that it is necessary that the liquid crystalline polymer content in the resin compound is 20 to 40% by weight, that is, the filler content is 60 to 80% by weight.

Next, when the filler content is 60 to 80% by weight, the contents of the whisker and the spherical fine particles are studied.

The resin compound obtained in Comparative Example 11 contains 10% by weight of the whisker and 60% by weight of the spherical fine particles. It can be seen that the reinforcing effect based upon a fibrous filler is small and mechanical strength is lowered since the whisker content is lower than that of the resin compound obtained in the above Example.

The resin compound obtained in Comparative Example 12 contains 30% by weight of the whisker and 40% by weight of the spherical fine particles. It can be seen that the orientation of the whisker contained in the molded article is large, anisotropy of shrinkage is large, and dimensional precision is lowered since the whisker content is higher than that of the above Example.

The resin compound obtained in Comparative Example 13 contains 25% by weight of the whisker and 35% by weight of the spherical fine particles. It can be seen that the orientation of the whisker contained in the molded article is large, anisotropy of shrinkage is large, and dimensional precision is lowered since the spherical fine particles content is lower than that of the resin compound obtained in the above Example.

The resin compound obtained in Comparative Example 14 contains 10% by weight of the whisker and 70% by weight of the spherical fine particles. It can be seen that the whisker content becomes low, the reinforcing effect based upon the whisker is small, and mechanical strength is lowered since the spherical fine particles content is higher than that of the resin compound obtained in the above Example.

From the results shown in the above, it can be seen that 20 to 40% by weight of the liquid crystalline polymer, 15 to 25% by weight of the whisker and 40 to 60% by weight of the spherical fine particles should be mixed together in order to increase mechanical strength without the impairment of dimensional precision, surface smoothness and low thermal expansive property.

In other words, since the resin compounds obtained in Examples 21 to 25 contain 20 to 40% by weight of the liquid crystalline polymer, 15 to 25% by weight of the whisker and 40 to 60% by weight of the spherical fine particles, and the total content of the whisker and the spherical fine particles is adjusted to 60 to 80% by weight, it can be seen that mechanical strength is increased without the impairment of dimensional precision, surface smoothness and low thermal expansive property.

Also, since the resin compound obtained in Example 25 is wide in the particle size distribution of the spherical fine particles, it can be seen that viscosity is lowered and moldability is improved.

EXAMPLE 26

After 30% by weight of p-hydroxybenzoic acid-2-hydroxy-6-naphthoic acid copolymer (made by Polyplastics Co., Ltd., trade name: Vectra A950) as the aromatic polyester thermotropic liquid crystalline polymer, 20% by weight of potassium 6-titanate whisker (average fiber length: 16 μm, aspect ratio: 15 to 70, made by Otsuka Chemical Co LTD., trade name: TISMO-N), 49% by weight of spherical silica fine particles (average particle diameter: 8 μm, $D_w/D_n=3.4$, made by Tatsumori Ltd., trade name: H8) and 1% by weight of N-(2-aminoethyl)-3-aminopropyltrimethoxysilane (made by Shin-Etsu Chemical Co., Ltd., trade name: KBM603) as the silane coupling agent were mixed together, a resin compound was prepared in the same manner as in Example 1. Then, its properties were measured in the same manner as in Example 1. The results are shown in Table 6.

From the results shown in Table 6, it can be seen that since the silane coupling agent is contained in the resin compound obtained in Example 25, adhesion of the filler to the resin is increased, tensile strength is increased, furthermore surface smoothness becomes excellent by the increase of dimensional precision, and coefficient of thermal expansion is low, so that the resin compound can be suitably used for molding precision parts.

EXAMPLE 27

Using the same materials as in Example 26, a resin compound was prepared in the same manner as in Example 26 except that the liquid crystalline polymer, potassium titanate whisker, the spherical silica fine particles and the silane coupling agent were mixed together so that each component was adjusted to the ingredients shown in Table 6. Then, its properties were measured in the same manner as in Example 1. The results are shown in Table 6.

From the results shown in Table 6, it can be seen that since the silane coupling agent is contained in the resin compound obtained in Example 27 nevertheless only 5% by weight of the whisker is contained therein, adhesion of the filler to the resin is increased, and furthermore dimensional precision is increased, so that the resin compound is excellent in surface smoothness and low in coefficient of thermal expansion, and can be suitably used for molding precision parts.

Other coupling agents can be used in the above resin compound in the same manner as in Examples 7 to 9, and the improvement of the properties was ascertained when the content was within the range of 0.5 to 3% by weight.

TABLE 6

| | Ingredients of resin compound (% by weight) | | | |
|---|---|---|---|---|
| | Liquid crystalline polymer | Potassium titanate whisker | Spherical silica fine particles | Silane coupling agent |
| Ex. No. | | | | |
| 21 | 20 | 25 | 55 | — |
| 22 | 25 | 15 | 60 | — |
| 23 | 30 | 20 | 50 | — |
| 24 | 40 | 20 | 40 | — |
| 25 | 25 | 15 | 60 | — |
| 26 | 30 | 20 | 49 | 1 |
| 27 | 25 | 5 | 69 | 1 |
| Com. Ex. | | | | |
| 8 | 30 | — | 70 | — |
| 9 | 15 | 25 | 60 | — |
| 10 | 50 | 15 | 35 | — |
| 11 | 30 | 10 | 60 | — |
| 12 | 30 | 30 | 40 | — |
| 13 | 40 | 25 | 35 | — |
| 14 | 20 | 10 | 70 | — |

| | Properties of resin compound | | | | | | |
|---|---|---|---|---|---|---|---|
| | Mold shrinkage (%) (machine direction/ transverse direction) | Surface roughness (μm) | Tensile strength (MPa) | Coefficient of linear expansion ($10^{-5}$/K) (machine direction/ transverse direction) | Melt viscosity (Pa·s) | Judgement | Note |
| Ex. No. | | | | | | | |
| 21 | 0.27/0.31 | 0.8 | 81 | 1.4/1.7 | 2500 | ○ | |
| 22 | 0.31/0.36 | 0.5 | 83 | 1.5/1.9 | 1300 | ○ | |
| 23 | 0.36/0.42 | 0.6 | 103 | 1.8/2.2 | 800 | ○ | |
| 24 | 0.44/0.47 | 0.5 | 107 | 2.2/2.7 | 710 | ○ | |
| 25 | 0.29/0.34 | 0.5 | 80 | 1.5/1.8 | 1100 | ⊙ | |
| 26 | 0.38/0.42 | 0.7 | 127 | 1.8/2.2 | 930 | ○ | |
| 27 | 0.34/0.47 | 0.6 | 98 | 1.4/1.7 | 1600 | ○ | |
| Com. Ex. | | | | | | | |
| 8 | 0.39/0.41 | 0.5 | 38 | 1.7/2.0 | 810 | X | Strength is low. |
| 9 | — | 0.8 | — | — | — | X | It is impossible to knead. |
| 10 | 0.45/0.53 | 0.5 | 99 | 3.4/4.0 | 460 | X | Coefficient of linear expansion is large. |
| 11 | 0.37/0.39 | 0.6 | 67 | 1.9/2.2 | 820 | X | Strength is low. |
| 12 | 0.24/0.48 | 0.6 | 122 | 1.5/1.9 | 770 | X | Difference between shrinkages is large. |
| 13 | 0.43/0.54 | 0.5 | 126 | 2.3/2.9 | 550 | X | Difference between |

TABLE 6-continued

| | | | | | | | |
|---|---|---|---|---|---|---|---|
| 14 | 0.23/0.27 | 0.6 | 47 | 1.5/1.6 | 3400 | X | shrinkages is large. Strength is low. |

From the aforementioned results, it can be seen that 20 to 40% by weight of the aromatic polyester thermotropic liquid crystalline polymer, 5 to 25% by weight of the whisker, 40 to 75% by weight of the spherical fine particles and 0.5 to 3% by weight of the silane coupling agent should be mixed together in order to increase mechanical strength without the impairment of dimensional precision, surface smoothness and low thermal expansive property.

Also, a resin compound was prepared in the same manner as in Example 26 except that vinylsilane, phenylsilane or methacrylsilane was used instead of N-(2-aminoethyl)-3-aminopropyltrimethoxysilane as the silane coupling agent so that its content was adjusted to by weight in Example 26. Then, a test piece was 1% molded in the same manner as in Examples 11 to 15. After the test piece was allowed to stand in an atmosphere having a temperature of 85° C. and a relative humidity of 85% for 100 hours, coefficient of moisture absorption and percentage of dimensional change were examined. As a result, it is ascertained that the resin compound is low in coefficient of moisture absorption and excellent in dimensional stability when vinylsilane or phenylsilane is mixed therewith.

Next, the following experiments were carried out in order to lower the melt viscosity when the filler content is high and improve moldability by adjusting the particle size distribution of the filler in case that the above liquid crystalline polymer is used as well as in case that polyphenylene sulfide is used as the resin component.

EXAMPLE 28

After 25% by weight of p-hydroxybenzoic acid-2-hydroxy-6-naphthoic acid copolymer (made by Polyplastics Co., Ltd., trade name: Vectra A950) as the aromatic polyester thermotropic liquid crystalline polymer, 20% by weight of potassium 6-titanate whisker (average fiber length: 16 μm, aspect ratio: 15 to 17, made by Otsuka Chemical Co Ltd, trade name: TISMO-N), 40% by weight of spherical silica fine particles (average particle diameter: 8 μm, $D_w/D_n$=3.4, made by Tatsumori Ltd., trade name: H8) and 15% by weight of spherical silica fine particles (average particle diameter: 2 μm, $D_w/D_n$=2.4, made by Tatsumori Ltd., trade name: SO-C5) were mixed together, a resin compound was prepared in the same manner as in Example 1. Then, its properties were measured in the same manner as in Example 1. The results are shown in Table 7.

There were two maximum values in the particle size-frequency distribution curve of the spherical silica fine particles used in Example 28.

From the results shown in Table 7, it can be seen that the resin compound obtained in Example 28 is excellent in moldability since melt viscosity is low and the resin compound is high in dimensional precision and surface smoothness of the molded article, and low in coefficient of thermal expansion, so that the resin compound can be suitably used for molding precision parts.

EXAMPLE 29

Using the same materials as in Example 28, a resin compound was prepared in the same manner as in Example 28 except that 25% by weight of p-hydroxybenzoic acid-2-hydroxy-6-naphthoic acid copolymer (made by Polyplastics Co., Ltd., trade name: Vectra A950) as the aromatic polyester thermotropic liquid crystalline polymer, 20% by weight of potassium 6-titanate whisker (average fiber length: 16 μm, aspect ratio: 15 to 17, made by Otsuka Chemical Co Ltd, trade name: TISMO-N), 40% by weight of spherical silica fine particles (average particle diameter: 8 μm, $D_w/D_n$=3.4, made by Tatsumori Ltd., trade name: H8) and 15% by weight of spherical silica fine particles (average particle diameter: 0.8 μm, $D_w/D_n$=2.3, made by Tatsumori Ltd., trade name: SO-C3) as the spherical fine particles were mixed together. Then, its properties were measured in the same manner as in Example 1. The results are shown in Table 7.

There are two maximum values in the particle size-frequency distribution curve of the spherical silica fine particles used in Example 28.

From the results shown in Table 7, it can be seen the resin compound obtained in Example 29 is excellent in moldability since melt viscosity is low, and the molded article produced therefrom is high in dimensional precision and surface smoothness, and low in coefficient of thermal expansion, so that the resin compound is suitable for molding precision parts.

EXAMPLE 30

A resin compound was prepared in the same manner as in Example 28 except that 40% by weight of spherical silica fine particles (average particle diameter: 8 μm, $D_w/D_n$=3.4, made by Tatsumori Ltd., trade name: H8) and 15% by weight of spherical silica fine particles (average particle diameter: 0.4 μm, $D_w/D_n$=2.0, made by Tatsumori Ltd., trade name: SO-C2) were used as the spherical fine particles in Example 28. Then, its properties were measured. The results are shown in Table 7.

EXAMPLE 31

A resin compound was prepared in the same manner as in Example 28 except that 40% by weight of spherical silica fine particles (average particle diameter: 0.8 μm, $D_w/D_n$=2.3, made by Tatsumori Ltd., trade name: SO-C3) and 15% by weight of spherical silica fine particles (average particle diameter: 0.4 μm, $D_w/D_n$=2.0, made by Tatsumori Ltd., trade name: SO-C2) were used as the spherical fine particles in Example 28. Then, its properties were measured. The results are shown in Table 7.

From the results shown in Table 7, it can be seen that the contact friction between the spherical silica fine particles during fluidizing and melt viscosity are lowered, and moldability is improved when the ratio of the two diameters (larger particle diameter/smaller particle diameter) having two maximum values shown in the particle size distribution of the spherical silica fine particles used in Example 28 is 4.

It can be seen that contact friction between the spherical silica fine particles during fluidizing and melt viscosity are lowered, and moldability is improved since the spherical silica fine particles having a ratio of the particle diameters of 10 are used in combination with each other in Example 29.

That is, there are two maximum values in the particle size-frequency distribution curve of the spherical fine particles in Examples 28 and 29, the ratio of the particle diameters having the maximum values is 4 to 10, and furthermore the ratio of their weight percentages is 2 to 6, so that the existence of the maximum values is remarkable. Accordingly, it can be seen that coefficient of thermal expansion is low, moldability becomes excellent, furthermore mechanical strength and dimensional precision are high, and surface smoothness is excellent since the maximum filler content is increased and melt viscosity is lowered, so that the resin compound is suitable for molding precision parts.

In the above Examples, the resin compounds showing two maximum values in the particle size-frequency distribution curve of silica are described. However, even though fine particles having a particle size distribution in which there are at least three maximum values are used, the same effects as the above are exhibited when the above conditions are satisfied with the ratio of the particle diameters having their maximum values and the ratio of their weight percentages.

Also, there are two maximum values in the particle size-frequency distribution curves of the two members of the spherical silica fine particles used in Example 30 and Example 31. However, the above ratios of particle diameters name: SO-C5) as the spherical fine particles, and 1% by weight of N-(2-aminoethyl)-3-aminopropyltrimethoxysilane (made by Shin-Etsu Chemical Co., Ltd., trade name: KBM603) as the silane coupling agent were mixed together, a resin compound was prepared in the same manner as in Example 1. Then, its properties were measured in the same manner as in Example 1. The results are shown in Table 7.

From the results shown in Table 7, it can be seen that the melt viscosity is lowered since spherical fine particles showing two maximum values in their particle size-frequency distribution curve are used as the spherical fine particles in the resin compound obtained in Example 32 similar to the resin compounds obtained in Examples 28 and 29, the ratio of the diameters having their maximum values is 4 to 10, and the ratio of their weight percentages is 2 to 6. Furthermore, it can be seen that since the silane coupling agent is contained in the resin compound, adhesion of the filler to the resin is increased, tensile strength is increased, dimensional precision is increased, surface smoothness becomes excellent and coefficient of thermal expansion is low, so that the resin compound can be suitably used for molding precision parts.

Other coupling agents can be used in the above resin compound in the same manner as in Example 5, and the improvement of the properties was ascertained when the content is within the range of 0.5 to 3% by weight.

TABLE 7

| | Ingredients of resin compound (% by weight) | | | |
|---|---|---|---|---|
| Ex. No. | Liquid crystalline polymer | Potassium titanate whisker | Average particle diameter of spherical silica fine particles (8.0/2.0/0.8/0.4 μm) | Silane coupling agent |
| 28 | 25 | 20 | 40/15/0/0 | — |
| 29 | 25 | 20 | 40/0/15/0 | — |
| 30 | 25 | 20 | 40/0/0/15 | — |
| 31 | 25 | 20 | 0/0/40/15 | — |
| 32 | 25 | 20 | 40/14/0/0 | 1 |

| | Properties of resin compound | | | | | |
|---|---|---|---|---|---|---|
| Ex. No. | Mold shrinkage (%) (machine direction/ transverse direction) | Surface roughness (μm) | Tensile strength (MPa) | Coefficient of linear expansion ($10^{-5}$/K) (machine direction/ transverse direction) | Melt viscosity (Pa · s) | Judgement |
| 28 | 0.28/0.33 | 0.7 | 86 | 1.5/1.7 | 940 | ⊚ |
| 29 | 0.31/0.35 | 0.7 | 88 | 1.6/1.9 | 980 | ⊚ |
| 30 | 0.29/0.35 | 0.5 | 79 | 1.5/1.8 | 1400 | ○ |
| 31 | 0.33/0.38 | 0.7 | 85 | 1.6/2.1 | 1400 | ○ |
| 32 | 0.30/0.35 | 0.8 | 119 | 1.6/1.9 | 1200 | ⊚ | are 16 and 2, respectively. Therefore, it was not ascertained that viscosity was lowered.

EXAMPLE 32

After 25% by weight of p-hydroxybenzoic acid-2-hydroxy-6-naphthoic acid copolymer (made by Polyplastics Co., Ltd., trade name Vectra A950) as the aromatic polyester thermotropic liquid crystalline polymer, 20% by weight of potassium 6-titanate whisker (average particle diameter: 16 μm, aspect ratio: 15 to 70, made by Otsuka Chemical Co Ltd, trade name: TISMO-N), 40% by weight of spherical silica fine particles (average particle diameter: 8 μm, $D_w/D_n$=3.4, made by Tatsumori Ltd., trade name: H8) and 14% by weight of spherical silica fine particles (average particle diameter: 2 μm, $D_w/D_n$=2.4, made by Tatsumori Ltd., trade

EXAMPLE 33

Using an injection molding machine (made by Technoplas INC., trade name: SIM4947), the resin compound obtained in Example 1 was molded under the molding conditions that the temperature of the resin was 320° C., the temperature of the mold was 170° C., injection speed was 73 cm³/second, holding pressure was 150 MPa, the period of time for holding the pressure was 3 seconds and the cooling period of time was 20 seconds to give a sleeve for an optical connector (inside diameter: 2.5 mm ø, outside diameter: 4.3 mm ø, length: 6.6 mm) shown in FIG. 4.

Figure 4:
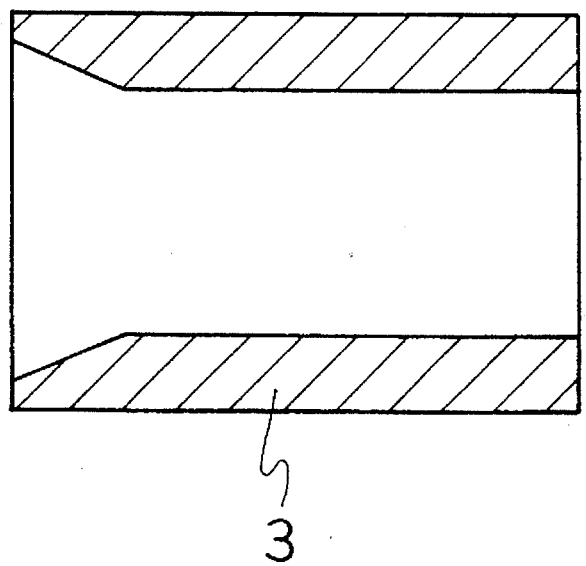
FIG. 4 is a sectional view of sleeves for an optical connector obtained in the examples of the present invention.

FIG. 4 is a sectional view showing one embodiment of the sleeve for an optical connector of the present invention, wherein 3 denotes the resin compound.

Next, circularity of the inside diameter of the above sleeve was measured by means of a circularity measuring machine (made by Taylor-Hobson, trade name: Talyrond).

Surface roughness of the inside of the above sleeve toward its center axis was measured by means of a surface roughness tester (made by Taylor-Hobson, trade name: Talysurf).

Compressive strength of the above sleeve toward its center axis was measured by means of a universal tester (made by ORIENTEC, trade name: TENSILON).

Coefficient of linear expansion of the above sleeve toward its center axis was measured by means of a thermal mechanical analyzer (made by Perkin-Elmer, trade name: TMA-7).

The above sleeve was embedded in an optical connector and connected with an optical fiber. The procedure comprising allowing to stand the optical connector at −40° C. for 1 hour and at 85° C. for 1 hour was hereinafter referred to as 1 cycle. After a heat cycle test was carried out by repeating the above cycle 500 cycles, optical loss of the optical fiber was measured. The results according to the above measurement are shown in Table 8.

From the results shown in Table 8, it can be seen that the sleeve obtained in Example 33 is a sleeve for an optical connector having high circularity, excellent surface smoothness, high mechanical strength, low coefficient of thermal expansion and small optical loss during connecting with an optical fiber since the resin compound obtained in Example 1 is used in the sleeve.

EXAMPLES 34 TO 39

Using the resin compounds obtained in Examples 2 to 4 and 7, a sleeve for an optical connector of an Example was produced in the same manner as in Example 33. Then, the properties of the sleeve were measured in the same manner as in Example 33. The results are shown in Table 8.

From the results shown in Table 8, it can be seen that the sleeves obtained in Examples 34 to 39 are sleeves having high circularity, high mechanical strength, excellent surface smoothness, low coefficient of thermal expansion and small optical loss during connecting with an optical fiber since the resin compounds obtained in Examples 2 to 4 and 7 are used in the sleeves.

Especially, it can be seen that the sleeve obtained in Example 39 is more excellent in moldability and smaller in optical loss, and is more improved in its properties in comparison with the sleeve obtained in Example 34 in which the same materials and the same amounts are used as in Example 39 except that the particle size distribution of silica is different therefrom.

Comparative Examples 15 to 21

Using the resin compounds obtained in Comparative Examples 1 to 7, a sleeve for an optical connector was produced in the same manner as in Example 33. Then, the properties of the sleeve were measured in the same manner as in Example 33. The results are shown in Table 8.

From the results shown in Table 8, it can be seen that the mechanical strength of the sleeve obtained in Comparative Example 15 is low since the whisker is not contained in the sleeve.

In Comparative Example 16, the resin compound having a filler content higher than that of the resin compound used in the above Example is used. Therefore, the melt viscosity is remarkably high and it is impossible to mold.

It can be seen that the resin compound having a filler content lower than that of the resin compound used in the above Example is used in the sleeve obtained in Comparative Example 17, so that coefficient of thermal expansion is increased and optical loss during connecting with an optical fiber is increased.

It can be seen that the reinforcing effect based upon the whisker is small since the resin compound having a whisker content lower than that of the whisker contained in the sleeve obtained in the above Example is used in the sleeve obtained in Comparative Example 18, so that mechanical strength of the sleeve for an optical connector is low.

It can be seen that the orientation of the whisker contained in the molded article is large and anisotropy of shrinkage is large since the resin compound having a whisker content higher than that of the whisker contained in the sleeve obtained in the above Example is used in the sleeve obtained in Comparative Example 19, so that circularity is lowered and optical loss during connecting with an optical fiber is large.

It can be seen that the orientation of the whisker contained in the molded article is large and anisotropy of shrinkage is large since the resin compound having a spherical fine particles content lower than that of the spherical fine particles contained in the sleeve obtained in the above Example is used in the sleeve obtained in Comparative Example 20, so that circularity of the sleeve for an optical connector is lowered and optical loss during connecting with an optical fiber is large.

It can be seen that the reinforcing effects based upon the whisker are small since the resin compound having a spherical fine particles content higher than that of the spherical fine particles and having a whisker content lower than that of the whisker contained in the sleeve obtained in the above Example is used in the sleeve obtained in Comparative Example 21, so that the mechanical strength of the sleeve for an optical connector is low.

EXAMPLES 40 TO 42

Using the resin compounds obtained in Examples 8 to 10, a sleeve for an optical connector was produced in the same manner as in Example 33. Then, the properties of the sleeve were measured in the same manner as in Example 33. The results are shown in Table 8.

From the results shown in Table 8, it can be seen that the sleeves obtained in Examples 40 to 42 are sleeves for an optical connector which are more increased in mechanical strength, high in dimensional precision, excellent in surface smoothness, low in coefficient of thermal expansion and small in optical loss during connecting with an optical fiber since the resin compounds with which the silane coupling agent is mixed are used in the sleeves obtained in Examples 40 to 42.

TABLE 8

| | Ingredients of resin compound (% by weight) | | | | |
|---|---|---|---|---|---|
| Ex. No. | Polyphenylene sulfide | Whisker | Spherical silica fine particles | Silane coupling agent | Material of whisker |
| 33 | 20 | 25 | 55 | — | Potassium titanate |
| 34 | 25 | 15 | 60 | — | Potassium titanate |
| 35 | 30 | 20 | 50 | — | Potassium titanate |
| 36 | 40 | 20 | 40 | — | Potassium titanate |
| 37 | 26 | 18 | 56 | — | Aluminum borate |
| 38 | 24 | 17 | 59 | — | Zinc oxide |
| 39 | 25 | 15 | 60 | — | Potassium titanate |
| 40 | 30 | 20 | 49 | 1 | Potassium titanate |
| 41 | 25 | 5 | 69 | 1 | Potassium titanate |
| 42 | 26 | 9 | 64 | 1 | Aluminum borate |
| Com. Ex. | | | | | |
| 15 | 30 | — | 70 | — | Potassium titanate |
| 16 | 15 | 25 | 60 | — | Potassium titanate |
| 17 | 50 | 15 | 35 | — | Potassium titanate |
| 18 | 30 | 10 | 60 | — | Potassium titanate |
| 19 | 30 | 30 | 40 | — | Potassium titanate |
| 20 | 40 | 25 | 35 | — | Potassium titanate |
| 21 | 20 | 10 | 70 | — | Potassium titanate |

| | Properties of sleeve for optical connector | | | | | | |
|---|---|---|---|---|---|---|---|
| Ex. No. | Circularity (μm) | Surface roughness (μm) | Compressive strength (kgf) | Coefficient of linear expansion ($10^{-5}$/K) | Optical loss (dB) | Judgement | Note |
| 33 | 1.0 | 0.6 | 67 | 1.5 | 0.7 | ○ | |
| 34 | 1.2 | 0.6 | 68 | 1.6 | 0.8 | ○ | |
| 35 | 1.1 | 0.5 | 88 | 1.8 | 0.9 | ○ | |
| 36 | 0.9 | 0.5 | 81 | 2.5 | 0.7 | ○ | |
| 37 | 0.9 | 0.6 | 75 | 1.8 | 0.6 | ○ | |
| 38 | 0.8 | 0.6 | 60 | 1.6 | 0.8 | ○ | |
| 39 | 1.1 | 0.6 | 70 | 1.6 | 0.7 | ◎ | |
| 40 | 1.1 | 0.5 | 105 | 1.9 | 0.8 | ○ | |
| 41 | 0.9 | 0.6 | 64 | 1.6 | 0.9 | ○ | |
| 42 | 0.9 | 0.6 | 66 | 1.7 | 0.8 | ○ | |
| Com. Ex. | | | | | | | |
| 15 | 1.2 | 0.7 | 33 | 1.8 | 1.0 | X | Strength is low. |
| 16 | — | — | — | — | — | X | It is impossible to mold. |
| 17 | 1.3 | 0.7 | 77 | 3.8 | 1.7 | X | Optical loss is large. |
| 18 | 0.8 | 0.6 | 48 | 1.8 | 1.0 | X | Strength is low. |
| 19 | 2.1 | 0.5 | 75 | 1.7 | 2.2 | X | Optical loss is large. |
| 20 | 2.3 | 0.5 | 90 | 3.1 | 2.5 | X | Optical loss is large. |
| 21 | 1.4 | 0.7 | 41 | 1.6 | 1.1 | X | Strength is low. |

EXAMPLES 43 TO 47

Using the resin compounds obtained in Examples 11 to 15, a sleeve for an optical connector was produced in the same manner as in Example 33, and the obtained sleeve was embedded in an optical connector.

Next, after the above connector was allowed to stand in an atmosphere having a temperature of 85° C. and a relative humidity of 85% for 100 hours, the dimensional change of the inside diameter and the optical loss were examined. The results are shown in Table 9.

TABLE 9

| Ex. No. | Kind of silane coupling agent | Dimensional change (μm) | Optical loss (dB) | Judgement |
|---|---|---|---|---|
| 43 | Vinylsilane | 0.27 | 0.4 | ◎ |
| 44 | Phenylsilane | 0.20 | 0.4 | ◎ |
| 45 | Epoxysilane | 0.91 | 1.3 | ○ |
| 46 | Aminosilane | 0.48 | 0.7 | ○ |
| 47 | Methacrylsilane | 0.74 | 1.0 | ○ |

From the results shown in Table 9, it can be seen that the dimensional change and the optical loss are low when a sleeve for an optical connector is molded by using the resin compound with which the silane coupling agent, especially vinylsilane or phenylsilane is mixed.

EXAMPLES 48 TO 49

Using the resin compounds obtained in Examples 16 and 17, a sleeve for an optical connector was produced in the same manner as in Example 33. Then, the properties of the sleeve were measured in the same manner as in Example 33. The results are shown in Table 10.

From the results shown in Table 10, it can be seen that the resin compounds obtained in Examples 16 to 17 are used in the sleeves obtained in Examples 48 to 49, respectively, so that the sleeves are high in circularity and mechanical strength, excellent in surface smoothness, low in coefficient of thermal expansion and small in optical loss during connecting with an optical fiber.

EXAMPLE 50

Using the resin compound obtained in Example 18, a sleeve for an optical connector was produced in the same manner as in Example 33. Then, the properties of the sleeve were measured in the same manner as in Example 33. The results are shown in Table 10.

From the results shown in Table 10, since the silane coupling agent is mixed with the sleeve obtained in Example 50, it can be seen that the sleeve is increased in mechanical strength, high in dimensional precision, excellent in surface smoothness, low in coefficient of thermal expansion and small in optical loss during connecting with an optical fiber.

EXAMPLES 51 TO 52

Using the resin compounds obtained in Examples 19 and 20, a sleeve for an optical connector was produced in the same manner as in Example 33. Then, the properties of the sleeve were measured in the same manner as in Example 33. The results are shown in Table 10.

Since the resin compounds obtained in Examples 19 and 20 are used in the sleeves obtained in Examples 51 and 52, respectively, it can be seen that the melt viscosity is not lowered and the optical loss during connecting with a fiber is not lowered.

From the results shown in Table 11, it can be seen that the sleeves obtained in Examples 53 to 57 are high in circularity and mechanical strength, excellent in surface smoothness, low in coefficient of thermal expansion, and small in optical loss during connecting with an optical fiber.

Especially, it can be seen that the circularity of the sleeve obtained in Example 57 is more increased and its properties are more improved since the moldability is more improved in comparison with those of the sleeve obtained in Example 54 in which the same materials and the same amounts are used as in Example 57 except that the particle size distribution of silica is different therefrom.

EXAMPLES 58 TO 59

Using the resin compound obtained in Example 26, a sleeve for an optical connector was produced in the same manner as in Example 33. Then, the properties of the sleeve were measured in the same manner as in Example 33. The results are shown in Table 11.

Since the resin compounds with which the silane coupling agent is mixed are used in these Examples, it can be seen that mechanical strength is more increased, smoothness dimensional precision is high, surface is excellent, coefficient of thermal expansion is low and optical loss during connecting with an optical fiber is small.

Also, a sleeve for an optical connector was produced in the same manner as in Example 33 by mixing 1% by weight of vinylsilane, phenylsilane, epoxysilane, aminosilane or methacrylsilane instead of the silane coupling agents contained in the resin compounds used in Examples 58 to 59, respectively. Next, after the obtained sleeve was allowed to stand in an atmosphere having a temperature of 85° C. and a relative humidity of 85% for 100 hours, dimensional change of the inside diameter and optical loss were exam-

TABLE 10

| | Ingredients of resin compound (% by weight) | | | |
|---|---|---|---|---|
| Ex. No. | Polyphenylene sulfide | Potassium titanate whisker | Average particle diameter of spherical silica fine particles (8.0/2.0/0.8/0.4 μm) | Silane coupling agent |
| 48 | 25 | 20 | 40/15/0/0 | — |
| 49 | 25 | 20 | 40/0/15/0 | — |
| 50 | 25 | 20 | 40/14/0/0 | 1 |
| 51 | 25 | 20 | 40/0/0/15 | — |
| 52 | 25 | 20 | 0/0/40/15 | — |

| | Properties of sleeve for optical connector | | | | |
|---|---|---|---|---|---|
| Ex. No. | Circularity (μm) | Surface roughness (μm) | Compressive strength (kgf) | Coefficient of linear expansion ($10^{-5}$/K) | Optical loss (dB) | Judgement |
| 48 | 0.8 | 0.4 | 70 | 1.6 | 0.5 | ⊚ |
| 49 | 0.7 | 0.4 | 73 | 1.7 | 0.5 | ⊚ |
| 50 | 0.8 | 0.4 | 101 | 1.8 | 0.6 | ⊚ |
| 51 | 1.1 | 0.5 | 72 | 1.7 | 0.9 | ○ |
| 52 | 1.2 | 0.5 | 75 | 1.8 | 0.9 | ○ |

EXAMPLES 53 TO 57

Using the resin compounds obtained in Examples 21 to 25, a sleeve for an optical connector was produced in the same manner as in Example 33. Then, the properties of the sleeve were measured in the same manner as in Example 33. The results are shown in Table 11.

ined. As a result, when vinylsilane, phenylsilane, epoxysilane, aminosilane or methacrylsilane, especially vinylsilane or phenylsilane, is mixed therewith, the dimensional change of the sleeve is small and optical loss is small.

Comparative Examples 22 TO 28

Using the resin compounds obtained in Comparative Examples 8 to 14, a sleeve for an optical connector was produced in the same manner as in Example 33, and the properties of the sleeve were measured in the same manner as in Example 33. The results are shown in Table 11.

From the results shown in Table 11, since the whisker is not contained in the sleeve obtained in Comparative Example 22, it can be seen that mechanical strength is low.

Since the filler content of the sleeve obtained in Comparative Example 23 is higher than that of the sleeve obtained in the above Example, it can be seen that the melt viscosity is remarkably high and it is impossible to mold.

Since the filler content of the sleeve obtained in Comparative Example 24 is lower than that of the sleeve obtained in the above Example, it can be seen that the coefficient of thermal expansion is increased and that the optical loss during connecting with an optical fiber is large.

Since the whisker content of the sleeve obtained in Comparative Example 25 is low, and the reinforcing effect based upon the whisker is small, it can be seen that mechanical strength is low.

Since the whisker content of the sleeve obtained in Comparative Example 26 is higher than that of the sleeve obtained in the above Example, the orientation of the whisker contained in the molded article is large, and anisotropy of shrinkage is large, it can be seen that the circularity is lowered and that the optical loss during connecting with an optical fiber is large.

Since the spherical fine particles content in the sleeve obtained in Comparative Example 27 is lower than that of the sleeve obtained in the above Example, the orientation of the whisker contained in the molded article is large, and anisotropy of shrinkage is large, it can be seen that the circularity is lowered and that the optical loss during connecting with an optical fiber is large.

Since the spherical fine particles content in the sleeve obtained in Comparative Example 28 is higher than that of the the sleeve obtained in the above Example, the whisker content becomes low, and the reinforcing effect based upon the whisker is small, it can be seen that the mechanical strength is low.

TABLE 11

| | Ingredients of resin compound (% by weight) | | | |
|---|---|---|---|---|
| Ex. No. | Liquid crystalline polymer | Potassium titanate whisker | Spherical silica fine particles | Silane coupling agent |
| 53 | 20 | 25 | 55 | — |
| 54 | 25 | 15 | 60 | — |
| 55 | 30 | 20 | 50 | — |
| 56 | 40 | 20 | 40 | — |
| 57 | 25 | 15 | 60 | — |
| 58 | 30 | 20 | 49 | 1 |
| 59 | 25 | 5 | 69 | 1 |
| Com. Ex. | | | | |
| 22 | 30 | — | 70 | — |
| 23 | 15 | 25 | 60 | — |
| 24 | 50 | 15 | 35 | — |
| 25 | 30 | 10 | 60 | — |
| 26 | 30 | 30 | 40 | — |
| 27 | 40 | 25 | 35 | — |
| 28 | 20 | 10 | 70 | — |

| | Properties of sleeve for optical connector | | | | | | |
|---|---|---|---|---|---|---|---|
| Ex. No. | Circularity (μm) | Surface roughness (μm) | Compressive strength (kgf) | Coefficient of linear expansion ($10^{-5}$/K) | Optical loss (dB) | Judgement | Note |
| 53 | 1.1 | 0.7 | 61 | 1.6 | 0.8 | ○ | |
| 54 | 1.2 | 0.5 | 65 | 1.7 | 0.7 | ○ | |
| 55 | 1.0 | 0.5 | 78 | 2.0 | 0.7 | ○ | |
| 56 | 1.1 | 0.5 | 71 | 2.5 | 0.9 | ○ | |
| 57 | 1.1 | 0.5 | 64 | 1.7 | 0.7 | ⊙ | |
| 58 | 1.0 | 0.6 | 98 | 2.0 | 0.9 | ○ | |
| 59 | 0.9 | 0.6 | 60 | 1.7 | 0.8 | ○ | |
| Com. Ex. | | | | | | | |
| 22 | 1.4 | 0.5 | 34 | 1.7 | 1.3 | X | Strength is low. |
| 23 | — | 0.7 | — | — | — | X | It is impossible to mold. |
| 24 | 1.5 | 0.5 | 72 | 3.7 | 1.7 | X | Optical loss is large. |
| 25 | 0.9 | 0.7 | 45 | 2.1 | 1.1 | X | Strength is low. |
| 26 | 1.8 | 0.5 | 69 | 1.7 | 2.1 | X | Optical loss is large. |
| 27 | 2.1 | 0.6 | 84 | 2.6 | 2.0 | X | Optical loss is large. |
| 28 | 1.5 | 0.7 | 41 | 1.6 | 1.0 | X | Strength is low. |

EXAMPLES 60 TO 61

Using the resin compounds obtained in Examples 28 and 29, a sleeve was produced in the same manner as in Example 33. Then, the properties of the sleeve were measured in the same manner as in Example 33. The results are shown in Table 12.

From the results shown in Table 12, it can be seen that the sleeves obtained in Examples 60 to 61 are high in circularity and mechanical strength, excellent in surface smoothness, low in coefficient of thermal expansion and small in optical loss during connecting with an optical fiber.

EXAMPLES 62 TO 63

Using the resin compounds obtained in Examples 30 and 31, a sleeve for an optical connector was produced in the same manner as in Example 33. Then, the properties of the sleeve were measured in the same manner as in Example 33. The results are shown in Table 12.

Since the resin compounds obtained in Examples 30 and 31 are used in the sleeves obtained in Examples 62 and 63, it can be seen that the melt viscosity is not lowered and the optical loss during connecting with an optical fiber is not lowered.

EXAMPLE 64

Using the resin compound obtained in Example 32, a sleeve for an optical connector was produced in the same manner as in Example 33. Then, the properties of the sleeve were measured in the same manner as in Example 33. The results are shown in Table 12.

From the results shown in Table 12, since the resin compound with which the silane coupling agent is mixed is used in Example 64, it can be seen that mechanical strength is more increased, dimensional precision is high, surface smoothness is excellent, coefficient of thermal expansion is low and optical loss is small during connecting with an optical fiber.

A sleeve for an optical connector is shown in the above Example. The same dimensional precision, surface smoothness, low coefficient of thermal expansion and mechanical strength as those of the sleeve for an optical connector are also required for a ferrule for an optical connector, and it is required that optical loss during connecting with an optical fiber is small.

A ferrule for an optical connector can be produced by the same molding method as a conventional one by using the above resin compound, and the same effects as the above are exhibited. Also, the same effects as the above are exhibited in molded articles having a function of a sleeve and a ferrule for an optical connector and having a shape such as a molded article wherein other parts are incorporated in the above sleeve and the ferrule for an optical connector.

As explained in the above, the resin compound of the present invention contains not only the spherical fine particles but also the whisker as a filler. Therefore, the contact area between the filler and the resin component is increased, and the mechanical strength is excellent.

Also, when the silane coupling agent is contained in the resin compound of the present invention, adhesion of the filler to the resin component is increased. Therefore, the mechanical strength is still more increased. Especially, when vinylsilane or phenylsilane is used as the silane coupling agent, the coefficient of moisture absorption is lowered and the dimensional stability is improved.

Also, in the resin compound of the present invention, when the spherical fine particles satisfy the particle size distribution represented by the inequality:

$$D_w/D_n > 5$$

wherein $D_w$ is weight average particle diameter and $D_n$ is number average particle diameter, the contact friction of the fillers with each other during fluidizing is lowered and the melt viscosity is lowered, so that moldability can be improved.

In the resin compound of the present invention, when there are plural maximum values in the particle size-frequency distribution curve of the spherical fine particles and the ratio of optional two diameters having maximum values which are contiguous with each other (larger particle diameter/smaller particle diameter) is 4 to 10, the contact friction of the fillers with each other during fluidizing can be more lowered, and the melt viscosity of the resin compound can be lowered. Therefore, the moldability can be improved.

Also, in the resin compound of the present invention, when spherical fine particles having the ratio of weight percentages of 2 to 6 are used as the above spherical fine particles, the contact friction of the fillers with each other during fluidizing is more lowered and the melt viscosity of an obtained resin compound is lowered. Therefore, the moldability can be improved.

TABLE 12

| | Ingredients of resin compound (% by weight) | | | |
|---|---|---|---|---|
| Ex. No. | Liquid crystalline polymer | Potassium titanate whisker | Spherical silica fine particles (average particle diameter: 8.0/2.0/0.8/0.4 μm) | Silane coupling agent |
| 60 | 25 | 20 | 40/15/0/0 | — |
| 61 | 25 | 20 | 40/0/15/0 | — |
| 62 | 25 | 20 | 40/0/0/15 | — |
| 63 | 25 | 20 | 0/0/40/15 | — |
| 64 | 25 | 20 | 40/14/0/0 | 1 |

| | Properties of sleeve for optical connector | | | | |
|---|---|---|---|---|---|
| Ex. No. | Circularity (μm) | Surface roughness (μm) | Compressive strength (kgf) | Coefficient of linear expansion ($10^{-5}$/K) | Optical loss (dB) | Judgement |
| 60 | 0.7 | 0.6 | 65 | 1.6 | 0.6 | ⊙ |
| 61 | 0.8 | 0.6 | 70 | 1.8 | 0.6 | ⊙ |
| 62 | 1.1 | 0.6 | 71 | 1.7 | 0.9 | ○ |
| 63 | 1.1 | 0.7 | 70 | 1.8 | 1.0 | ○ |
| 64 | 0.7 | 0.8 | 91 | 1.8 | 0.6 | ⊙ |

Accordingly, the sleeve and the ferrule in which the resin compound of the present invention is used are high in mechanical strength and improved in reliability.

The embodiments or the Examples of the present invention explained in the above have been described for merely clarifying the art of the present invention. The present invention is not limited to only the concrete examples, is not interpreted in a narrow sense, and can be carried out with various changes and modifications within the spirit and the scope in the Claims of the present invention.

INDUSTRIAL APPLICABILITY

The resin compound of the present invention can be suitably used for parts for optical communication, for instance, a sleeve, a ferrule and the like, since mechanical strength can be increased without the impairment of dimensional precision, surface smoothness and low thermal expansive property.

We claim:

1. A resin compound for molding precision parts comprising 20 to 40% by weight of at least one of a polyphenylene sulfide and an aromatic polyester thermotropic liquid crystalline polymer, 15 to 25% by weight of a whisker and 40 to 60% by weight of spherical fine particles, wherein the total content of the whisker and the spherical fine particles is 60 to 80% by weight, and wherein the spherical fine particles satisfy the particle size distribution represented by the inequality:

$$D_w/D_n > 5$$

wherein $D_w$ represents weight average particle diameter and $D_n$ represents number average particle diameter.

2. A resin compound for molding precision parts comprising 20 to 40% by weight of at least one of a polyphenylene sulfide and an aromatic polyester thermotropic liquid crystalline polymer, 15 to 25% by weight of a whisker, 40 to 75% by weight of spherical fine particles and 0.5 to 3% by weight of a silane coupling agent, wherein the total content of the whisker and the spherical fine particles is 60 to 80% by weight, and wherein the spherical fine particles satisfy the particle size distribution represented by the inequality:

$$D_w/D_n > 5$$

wherein $D_w$ represents weight average particle diameter and $D_n$ represents number average particle diameter.

3. The resin compound of claim 2, wherein the silane coupling agent is vinylsilane or phenylsilane.

4. The resin compound of claim 2, wherein there are plural maximum values in the particle size distribution of the spherical fine particles, and the ratio of two particle diameters having maximum values (larger particle diameter/smaller particle diameter) is 4 to 10.

5. The resin compound of claim 4, wherein the ratio of weight percentages of two particle diameters having maximum values (the percentage of the parities having larger particle diameter/the percentage of the particles having smaller particle diameter) is 2 to 6.

6. A sleeve molded with the resin compound of claim 2, wherein a ferrule in which an optical fiber is embedded is inserted and sustained.

7. A ferrule molded with the resin compound of claim 2, wherein an optical fiber is embedded.

8. The resin compound of claim 2, wherein the whisker has an average fiber length of 30 μm or less.

9. The resin compound of claim 2, wherein the whisker has an aspect ratio of 5 to 500.

10. The resin compound of claim 2, wherein the spherical fine particles are silica, glass beads or alumina beads.

* * * * *